United States Patent [19]
Thomas

[11] 3,767,432
[45] Oct. 23, 1973

[54] PRODUCTION OF $P_2O_5$-$SIO_2$ PRODUCTS

[75] Inventor: Ian M. Thomas, Temperance, Mich.

[73] Assignee: Owens-Illinois, Inc., Toledo, Ohio

[22] Filed: Apr. 8, 1971

[21] Appl. No.: 132,581

[52] U.S. Cl.............. 106/52, 106/73.5, 117/93.4, 259/317

[51] Int. Cl............................ C03c 3/06, C03c 3/04

[58] Field of Search.................... 106/52, 39 R, 47; 260/37 SB, 448.8 A; 65/134, DIG. 14; 23/182; 117/93.4; 423/299, 305, 304, 326, 338; 252/317

[56] References Cited
UNITED STATES PATENTS

| | | | |
|---|---|---|---|
| 3,414,463 | 12/1968 | Jasinski | 260/46.5 |
| 3,554,698 | 1/1971 | Burzynski et al. | 23/182 |
| 3,597,252 | 8/1971 | Schroder et al. | 106/52 |
| 2,995,453 | 8/1961 | Noble et al. | 106/39 R |
| 3,065,089 | 11/1962 | Hustinx | 106/52 |
| 3,244,639 | 8/1966 | Mindick et al. | 106/52 |
| 2,571,039 | 10/1951 | Hyde | 260/37 |
| 3,432,312 | 3/1969 | Feagin et al. | 106/69 |
| 3,640,093 | 2/1972 | Levene et al. | 65/134 |
| 2,524,358 | 10/1950 | Robey | 106/287 |

OTHER PUBLICATIONS

Dislich–Glastechnischen Berichte, "Preparation of Multicomponent Glasses Without Fluid Melts" 44 Jahgang, Jan. 1971, Heft 1, pp. 1–8.

Gefter – "Organophosphorus Monomers & Polymers" pp. 240–241 (1962).

Roy, R; Aids in Hydrothermal Experimentation (II), in Journ. Amer. Cer. Soc., 39 (4) pp. 145–147 (1956) (TP785A62).

McCarthy, G. J., et al.; Gel Route to Homogeneous Glass Preparation; in Journ. Amer. Cer. Soc., 54 (12) 639–70 (1971) (TP785A62).

Tien, T. Y. et al.; The System $SiO_2$–$P_2O_5$; in Journ. Amer. Cer. Soc., 45 (9), 422–424 (1961) (TP785A62).

*Primary Examiner*—Helen M. McCarthy
*Attorney*—E. J. Holler and Robert F. Rywalski

[57] ABSTRACT

A method is provided for producing homogeneous oxide products of phosphorus and silicon such as, for example, a $P_2O_5$ and $SiO_2$ glass by a process which comprises: forming a clear solution of a soluble, substantially linear, further polymerizable polymer having phosphorus-oxygen-silicon linkages by intimately contacting phosphorous acid, phosphoric acid, phosphorus pentoxide, or mixtures thereof, with a single phase solution of an at least partially hydrolyzed silicon alkoxide, converting the solution of said further polymerizable polymer to a gel in the presence of a sufficient quantity of water to cross-link said polymer, then removing free liquid components from the gel and thermally degrading the residue to a homogeneous oxide product. This oxide product may be converted to a substantially unitary shape by conventional melting techniques or by conventional sintering techniques. The product may, accordingly, be used as an additive in conventional glass melting operations to supply at least a portion of the silica and $P_2O_5$ requirement or the product may be compacted and suitably fired, for example sintered, into a substantially unitary solid body, which body is an excellent target in sputtering applications for forming films on semi-conductive materials such as, for example, silicon chips.

10 Claims, No Drawings

PRODUCTION OF $P_2O_5$-$SiO_2$ PRODUCTS

THE INVENTION

The present invention relates to processes for forming oxide products of phosphorus and silicon and, more particularly, the present invention relates to the formation of phosphorus pentoxide-silica containing glass compositions from gelled polymers having phosphorus-oxygen-silicon linkages. Still, more particularly, this invention relates to the formation of phosphorus pentoxide-silica compositions suitable for use as sputtering targets.

The concept and phenomena of sputtering is well known in the prior art. As used herein, sputtering is intended to comprise and comprehend any process whereby particles, whether molecular and/or atomic size, are disintegrated, dislodged, evaporated, or otherwise removed from a so-called target material and transferred to a selected surface, the removal of the target material being by means of any appropriate energy such as electron beam, laser beam, plasma discharge, or the like. In a preferred type of sputtering process, as comprehended herein, the target material is disintegrated and transferred to a selected surface, such as, for example, a semiconductive surface, by means of a RF sputtering process as described, for example, by Messrs. Vossen and O'Neill, Jr. in RCA Review, June, 1968, pages 149–179; that is, a process involving the atomic disintegration of a solid target appropriately struck by ions or atoms in a gaseous plasma discharge.

In sputtering processes of the type described above, there is a need, in order to produce high quality films on the substrates, for example, platinum substrates or silicon substrates or other semiconductive substrates, that the target material be of a sputterable composition which is very homogeneous in nature. Likewise, in order to produce high quality films, there is a need that the target not only be of a homogeneous composition but that it likewise be a pure composition.

In the art of manufacturing oxide products containing phosphorus and silicon, such as, for example, melting glass batch compositions to form $P_2O_5$ containing silica glasses, there are problems which need a solution. Among these problems, some of the most notable reside in the necessary use in the glass batch of $P_2O_5$ furnishing ingredients which are extremely volatile or which are very toxic. The volatility of these materials, for example, the use of $P_2O_5$ itself, obviously causes extreme difficulty in obtaining the desired stoichiometric proportions of the material into the final product. Likewise, this volatilization creates an undesirable situation because the volatilized material must be recovered by suitable equipment if it is not to be allowed to pollute and decrease the quality of the atmosphere. Thus, in short, there is a need for a more thermally stable, less volatile source of $P_2O_5$ in the manufacture of $P_2O_5$ containing silica glasses.

With the foregoing in mind, it is an object of this invention to provide a homogeneous oxide product of silicon and phosphorus.

Yet another object of this invention is to provide an extremely high purity oxide product of phosphorus and silicon.

A still further object of this invention is to provide a homogeneous and high purity phosphorus pentoxide-silica target material, which may be employed to form high quality films on substrates by conventional sputtering techniques.

Yet another object of this invention is to provide a thermally stable source of $P_2O_5$ and silica, which may be employed as a batch-forming ingredient in the conventional manufacture of $P_2O_5$ containing silica glasses.

Yet another object of the present invention is to provide a novel process for the formation of homogeneous oxide products of phosphorus and silicon.

Thus, according to one aspect of this invention, after a silicon alkoxide has been at least partially hydrolyzed with water in the presence of an effective catalytic amount of an acid hydrolysis catalyst to produce a single phase solution, a homogeneous oxide product is obtained by a method which comprises: forming a clear solution of a soluble, substantially linear, further polymerizable polymer having phosphorus-oxygen-silicon linkages by intimately contacting phosphorous acid, phosphoric acid, phosphorus pentoxide or mixtures thereof, with said single phase solution of the at least partially hydrolyzed silicon alkoxide; converting said solution of said further polymerizable polymer to a gel in the presence of a sufficient quantity of water to cross-link said polymer; removing free liquid components from said gel, and converting the liquid-free residue to said homogeneous product, usually by a thermal heating or calcination step.

According to another feature of this invention, there is provided a method for producing a sputterable, homogeneous, oxide product consisting essentially of about 8 to about 26 weight percent $P_2O_5$ and about 92 to about 74 weight percent $SiO_2$, which comprises: hydrolyzing ethyl orthosilicate, in the presence of an effective catalytic amount of an acid hydrolysis catalyst, with water in the presence of a sufficient quantity of alcohol to form a single phase solution of an at least partially hydrolyzed ethyl orthosilicate, wherein the amount of water to the amount of ethyl orthosilicate is in the molar ratio of about 1:1 or its equivalent; reacting the at least partially hydrolyzed ethyl orthosilicate solution with phosphorous acid, phosphoric acid, phosphorus pentoxide or mixtures thereof, to form a clear solution of a substantially linear, further polymerizable polymer having phosphorus-oxygen-silicon linkages, the amount of phosphorus pentoxide or phosphoric or phosphorous acid added, based on the equivalent $P_2O_5$ content, being so selected that the system based exclusively on $P_2O_5$ and the $SiO_2$ equivalent of the ethyl orthosilicate will provide the desired composition of these two constituents; cross-linking the linear, further polymerizable polymer by the addition of a sufficient quantity of water thereto to form a gel; heating the gel to a temperature and for a time sufficient to decompose said gel to a granular oxide product of silicon and phosphorus. This oxide product is then advantageously converted to a substantially unitary shape. The conversion may comprise the steps of forming sintered products by conventional techniques, that is, compacting the product and then sintering it or it may, for example, comprise melting the oxide product and forming unitary glass objects. According to still another aspect of this invention, the unitary shape as formed above is used as a sputtering target using conventional sputtering techniques.

According to another aspect of this invention, a homogeneous glassy product of phosphorus and silicon is produced by a method which comprises: heating a silicon alkoxide, for example, a compound of the formula $SiX_nY_{(4-n)}$, wherein X is phenyl or an alkyl of 1 to 6 carbon atoms, Y is OR, wherein R is an alkyl of 1 to 6 carbon atoms, and n is 0, or 1, in the presence of an effective catalytic amount of an acid hydrolysis catalyst with water to a temperature and for a time sufficient to at least partially hydrolyze said compound and produce a substantially gel-free, single phase solution; reacting said single phase solution of said at least partially hydrolyzed compound with phosphorous acid, phosphorus pentoxide, phosphoric acid or mixtures thereof to form a clear solution of a substantially linear, solvent soluble, further polymerizable polymer having phosphorus-oxygen-silicon linkages; converting said linear polymer which is in solution to a cross-linked polymer in the presence of a sufficient quantity of water to gel said solution; and removing free liquid components from the gel and then converting the liquid free residual material to a homogeneous oxide product. In the usual instance, the gel will be heated to evaporate free liquid components and then the remaining dry material will be heated to a temperature of about 300° C. or 350° C. to as high as 800° C. or 900° C. or even higher to thermally degrade organic and volatile constituents and produce an inorganic, solid, generally granular material. This heating effects the removal of carbon which may remain in the polymer in the form of alkoxy linkages and this is evidenced by the fact that, during the heating, the product will initially go through a black stage which, upon further heating, will be converted to a substantially white glassy-like product. Quite acceptable results will be realized when the heating, during the hydrolysis step, is done, for example, between about 40° C. and reflux and when the amount of water present in the heating step is between about 0.1 or 0.2 to less than about 3 moles of water per mole of silicon alkoxide. Additionally, the conversion of the linear polymer to the cross-linked polymer and gelling of the solution will advantageously be effected by adding additional water such that the additional amount of water will be more than that theoretically required to hydrolyze the alkoxy groups initially present in the system; for example, the addition of four or five moles of water, or even more, per mole of the silicon alkoxide employed will be the usual convenient procedure. The amount of phosphorus pentoxide, phosphoric acid, phosphorous acid or mixtures thereof which are employed will be routinely selected by those skilled in the art to suit their particular purpose. In the usual procedure, however, the amount added, based on equivalent $P_2O_5$ content, will have a molar ratio of generally less than about 1 mole of $P_2O_5$ per 1 mole of equivalent $SiO_2$ present in the silicon alkoxide.

According to yet another aspect of this invention, there is provided a substantially unitary, solid, homogeneous, sputterable body consisting essentially of about 8 to 26 weight percent $P_2O_5$, preferably about 15 to 19 weight percent $P_2O_5$, and about 74 to 92 weight percent $SiO_2$, preferably about 85 to 81 weight percent $SiO_2$, and wherein the alkali metal oxide impurities are less than about 300 parts per million.

As will be readily apparent from the foregoing, the ingredients in the process for producing the oxide product of phosphorus and silicon as contemplated herein, are generally silicon alkoxide, water, phosphorus pentoxide, phosphoric acid or phosphorous acid and an acid hydrolysis catalyst. The term "phosphoric acid" contemplates the various species thereof, including aqueous phosphoric acid, anhydrous phosphoric acid, such as may be produced by saturating, or even supersaturating, aqueous phosphoric acid with phosphorus pentoxide, anhydro-acids of ortho phosphoric acid and the polyphosphoric acids; thus such compounds as $H_3PO_4$, $H_4P_2O_7$, $HPO_3$, $H_4P_2O_6$ and $H_6P_4O_{13}$ are included. Of these ortho phosphoric acid is preferred. Similarly, phosphorous acid contemplates the various species thereof including $H_3PO_3$, $H_3PO_2$, $H_4P_2O_5$. Those skilled in the art, of course, appreciate that phosphorus pentoxide is, perhaps, more accurately termed "phosphoric anhydride". Thus, the purity of the final product is easily and routinely controlled by selecting the purity of the ingredients involved. The alkali metal oxide impurities, for example, are easily maintained below about 300 parts per million and, by employing purer starting materials, the impurity level can be decreased to levels of 100 or 50 parts per million and less.

As will be apparent, the important features of this invention reside in first forming a clear solution of a soluble substantially linear, further polymerizable polymer having phosphorus-oxygen-silicon linkages, then converting this linear polymer to a cross-linked polymer in the presence of a sufficient quantity of water to gel the solution and then isolating and recovering the phosphorus-silicon oxide product. In order to form the substantially linear, further polymerizable soluble polymer, a silicon alkoxide is at least partially hydrolyzed with water in the presence of an acid hydrolysis catalyst to produce a gel-free, single phase solution of at least partially hydrolyzed silicon alkoxide. Typical hydrolysis catalysts which may be employed include the mineral acids, for example, hydrochloric acid or nitric acid or Lewis Acid catalyst comprising compounds of a transitional element which is zirconium or titanium or compounds of non-transitional element, such as aluminum. The hydrolysis catalyst will, of course, be used in any effective catalytic amount such as, for example, about 1 to about 500 parts by weight per million parts by weight of the silicon alkoxide. The art is well aware of the techniques for hydrolyzing silicon alkoxides with water to produce a substantially gel-free, single phase solution of an at least partially hydrolyzed silicon alkoxide. These techniques may likewise be employed in the present invention to produce the starting gel-free, single phase solution. Silicon alkoxides which may be employed include compounds of the formula represented by I and II below:

I

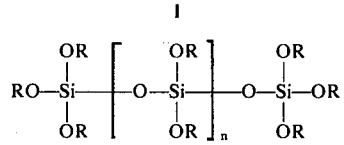

wherein n is an integer between 0 and 10 and wherein R is an alkyl group having 1–6 carbon atoms, such as, for example, methyl, ethyl and isomeric forms of propyl, normal butyl and the isomeric forms thereof, etc.

II $SiX_nY_{(4-n)}$ wherein X is phenyl or an alkyl having 1 to 6 carbon atoms as set forth above, like methyl or ethyl, n is 0 or 1, and Y is OR, wherein R is an alkyl having 1 to 6 carbon atoms, for example, ethyl. Especially suitable silicon alkoxides are the type represented by Formula II. Preferably, in compounds of this type, the alkyl group will be an ethyl group. An especially preferred compound will be tetraethoxysilane (ethyl orthosilicate). In passing, it should be mentioned that, in a manner well known in the art, when a compound represented by Formula I or by Formula II (wherein n is 0) is employed, a suitable organic solvent will be used to maintain and produce the single phase solution of the at least partially hydrolyzed material and whatever low molecular weight species of partially condensed material may be present. Suitable solvents include mono, di and trihydric alcohols, including the monoalkylethers of dihydric alcohols, cyclic ethers, like dioxane and tetrahydrofuran, and other water soluble organic solvents. The $C_1$ to $C_3$ alkyl alcohols, like ethanol, are especially preferred. The amount of these solvents required to obtain the single phase solution of the at least partially hydrolyzed product of Formulas I and II as described above, i.e., wherein n is 0 in Formula II, will be routinely selected by those skilled in the art. Convenient amounts, for example, are about 3–10, preferably about 5–6, volumes of the preferred alcohol per volume of water employed in the hydrolysis step. When compounds represented by Formula II are at least partially hydrolyzed, wherein n is 1, there will usually be no need to employ a solvent because the byproduct alkanol will have a solvent action on the products of the hydrolysis reaction between water and these compounds. Of course, there is no objection, other than perhaps economical reasons, to employing a similar type solvent in these systems.

The amount of water employed to produce the at least partially hydrolyzed silicon alkoxide will also be routinely selected by those skilled in the art once given the guideline that a single phase solution of the at least partially hydrolyzed material is to be used. For example, when using compounds represented by Formula I, or Formula II (wherein n is 0), a suitable molar proportion of water to the silicon alkoxide employed may be in the range, for example, of about 0.1 or 0.2 to about 1.9 moles for convenient process performance; a molar ratio, for example, of about 1:1, will produce excellent results. Convenient amounts of water which will be employed when the compound is a compound represented by Formula II (with n being 1) will be about 0.1 or 0.2 to about 3 moles of water per mole of the trialkoxy functional silane, with ratios of 1 to 1½:1 producing excellent results. Higher amounts, for example, ratios of 3:1 or even 10:1 may be used with the higher ratio applying to the lower alkoxy materials, for example, the $C_1$-$C_3$ trialkoxysilane and the lower ratio to the higher, e.g., $C_4$–$C_6$ alkoxy silane. In the usual instance, it will be convenient to increase the hydrolysis rate by heating the silicon alkoxide with water to a temperature of about 40° C. to and including the reflux temperature and holding it there for several minutes, say, 5 or 10 minutes to about 15 minutes to obtain the single phase gel-free solution.

After providing the gel-free, single phase solution of the at least partially hydrolyzed silicon alkoxide, there is next involved the formation of a substantially linear, solvent soluble, further polymerizable phosphorosiloxane or, perhaps, more appropriately, a phosphoroorganosiloxane (because the material will usually at this time still have residual alkoxy groups thereon) and then this linear polymer is cross-linked to form a three-dimensional structure in the presence of sufficient water to form a gel. Thus, to the substantially gel-free, single phase solution of the at least partially hydrolyzed silicon alkoxide, there is then added an acid, anhydride or oxide of phosphorus of the type previously indicated, which reacts to form a substantially linear polymer of the type described immediately above having phosphorus-oxygen-silicon linkages. The amount of phosphoric acid, phosphorous acid, or phosphorus pentoxide added will be routinely selected by those skilled in the art but, most advantageously, the amount will be at least about 0.3, but more typically, 1 or 2, parts by weight of equivalent $P_2O_5$ content per about 99 parts by weight of equivalent $SiO_2$ in the starting alkoxide. The reaction is evidenced by the evolution of heat and there is at this point a clear, transparent solution of this reaction product. Subsequently, in the presence of sufficient water, this solution gels as a result of the cross-linking of the initially linear, further polymerizable, soluble material. In the usual practice of this invention, when employing the general amounts of water indicated above, it is convenient to add an additional amount of water, say, for example, on the order of four or five moles of water, or even more, per mole of silicon alkoxide initially employed to effect the cross-linking and gelation when the alkoxide is a compound of Formula II. If desired, however, additional water may be employed in the hydrolysis step such that after the addition of the phosphorous acid, phosphorus pentoxide, phosphoric acid, or mixture thereof, the clear solution of the substantially linear, soluble, further curable polymer having phosphorus-oxygen-silicon linkages will itself gel after setting for a short period of time, e.g., 5 or 6 hours. This adjustment of water will, of course, be routinely made by those skilled in the art and is comprehended within the present invention. In the usual instance, in order to convert the soluble substantially linear, further curable polymer having phosphorus-oxygen-silicon linkages to a cross-linked structure by the formation of a gel, the effective cross-linking or gelling amount of water present will generally be at least about 1 mole of water per 20R groups per mole of silicon alkoxide initially employed. With compounds of Formula I, wherein n, for example, is 2, the amount of water will generally be at least about 5 moles per mole of Formula I compound. When compounds represented by Formula II are employed, wherein n is 0, the amount of water will generally be at least about 2 moles per mole of the tetraalkoxy functional material. Similarly, when using compounds of Formula II, wherein n is 1, the amount of water will generally be at least about 1.5 moles per mole of the silane employed. In order to obtain more desirable rates of cross-linking and gel formation, however, it will be advantageous to use an excess of these amounts, e.g., 2–3 times these amounts, or even more. Particularly advantageous amounts will be between about 2 to about 6 times the minimum amounts set forth.

After producing the gel as described above, residual free liquid constituents therein, e.g., alcohols and water, are removed and an inorganic oxide product isolated and recovered. This is usually done by a thermal degradation step which may include appropriately heating the gel to evaporate free liquids and degrade organic components therein to thereby produce an inorganic residue of the oxide product, or the gel may also be thermally degraded by heating in a pressure vessel at a temperature above the critical temperature of the liquid components of the gel so as to vaporize and remove such liquid components and convert the gel to an aerogel product having a high surface area. A typical procedure is to simply evaporate the free liquid components by heating at about 50° C. to about 125° C. under vacuum and then calcining the material, for example, by heating to temperatures of about 300° C. to 800° or 900° C. Most typically, however, heating to about 400° C. to 600° C. will be quite sufficient.

Of course, if desired, other constituents may be added into the system most advantageously at the point where there is a solution of the linear, further polymerizable, soluble polymer having phosphorus-oxygen-silicon linkages in a manner more fully disclosed in copending application U.S. Ser. No. 843,777, now U.S. Pat. No. 3,640,093, which is assigned to the same assignee as the present application.

The $P_2O_5$–$SiO_2$ product may, as previously indicated, be employed as a batch material in the production of $P_2O_5$ containing silica glasses. Conventional melting techniques may be employed with at least a portion of the $P_2O_5$ content of the desired glass and, most desirably, all being supplied in the form of the $P_2O_5$-$SiO_2$ material produced in the manner described above. This will be found to be particularly advantageous inasmuch as the phosphorus-oxygen-silicon linkages in this material show excellent thermal stability and thus volatization losses will be substantially minimized, if not entirely reduced, by using this material.

According to another feature of this invention, the phosphorus-silicon oxide product as produced above will be formed into a substantially solid unitary body and then employed in a conventional sputtering application to form extremely desirable films on semiconductive materials. These substantially solid, unitary bodies may, for example, be fabricated by conventional sintering techniques wherein the material is first pressed into an appropriate shape and then sintered or even melted to produce the desired final, solid body. Thus, excellent sputterable bodies may be made in accordance with the foregoing description which will consist essentially of about 8 to 26 weight percent $P_2O_5$ and, more desirably, about 15 to 19 weight percent $P_2O_5$ and about 74 to 92 weight percent $SiO_2$ and, more desirably, about 85 to 81 weight percent $SiO_2$ and will contain less than about 300 parts per million of alkali metal oxides.

In order to allow those skilled in the art to more fully understand the invention and to assist them in making and using the present invention, the following examples are given, not by way of limitation but rather by way of illustration.

EXAMPLE 1

Into a beaker there was added 288 grams (1.38 moles) of ethyl orthosilicate and there was then added to the ethyl orthosilicate about 200 ml (about 4.35 moles) of anhydrous ethanol. There was then produced a single phase solution of the ethyl orthosilicate. To this solution there was then added with mild agitation about 24.8 ml. (1.38 moles) of distilled water. Again, after the addition of water, the system was a single phase, clear solution. Into this solution there was then added about 0.1 ml of 1 N. nitric acid and there then remained a clear solution. This solution was then heated to approximately 65° C. to assist the hydrolysis of the ethyl orthosilicate and upon reaching this temperature, a clear solution was present. In passing, it should be noted that this solution, when subjected to conventional electrophoretic deposition techniques will not result in any deposit and the partially hydrolyzed product still contains substantial silicon-ethoxy linkages. This solution was then allowed to cool several degrees and then into the solution there was added 26.7 grams of an 85 weight percent aqueous solution of ortho phosphoric acid. Upon addition of the phosphoric acid, there is produced a solvent soluble, linear, further polymerizable phosphoro-siloxane polymer composition as evidenced by the fact that heat was generated with the addition but it should be noted that there still remained a clear solution. In passing, it should also be noted that at this point in the reaction, this phosphorosiloxane polymer will also have present in its structure, in addition to a phosphorus-oxygen-silicon linkage, silicon-ethoxy linkages because at this point the hydrolysis has not been entirely completed. On a theoretical oxide equivalent basis, there is now present in the system approximately 17 grams of $P_2O_5$ and about 83 grams of $SiO_2$.

Into this clear, phosphorosiloxane polymer containing solution there was then added about 5.3 gram-moles of water to assist in cross-linking by reacting with residual ethoxy groups. After the addition of water there remained a clear solution. After setting for approximately 10 to 15 minutes, the system changed from a clear solution to a clear gel. This gel was then removed from the beaker and placed in trays and heated in an oxygen ventilated oven at about 100° C. overnight for purposes of removing free liquid components from the system. The isolated dried phosphorosiloxane was then heated to 600° C. for about two hours in an oxygen-ventilated oven to insure further solvent removal and to decompose organic matter. The material at this stage was black, indicating the presence of elemental carbon. This material was then further heated to a temperature of about 1830° F. for about 18 hours, whereby it converted to a white particulate mass. This white mass was then passed through a 100 mesh (U. S. Sieve) screen and then dry-pressed into a disk (about 1.22 inch diameter), suitable for sputtering, in a hydraulic press at 10,000 psi. This disk was sintered by heating to, and holding for about 15 minutes, at a temperature between about 2200° F. to about 2300° F. to produce a disk with the desired physical strength.

Another disk was prepared from a sample manufactured in the manner described above by mixing approximately 333 grams of the phosphorosiloxane powder with about 10 grams of a binder (polyethylene glycol manufactured and sold under the trade name "CARBOWAX 20 M") and approximately 100 cc of acetone. A portion of the acetone was allowed to evaporate until the slurry took on the consistency of tooth paste and was then granulated by passage through an 8-mesh screen (U. S. Sieve). The granulated material was allowed to set overnight to further complete the acetone evaporation. The resulting dried material containing the polyethylene glycol binder was then pressed into a disk of about 5.1 inches in diameter with a hydraulic pressure of about 50 tons. This pressed green disk was then sintered by conventional heating techniques. In this specific instance, the disk was first heated to about 500° F. and then held there for a time of about one-half hour, then gradually heated to 1830° F. and held there for about one hour, then heated to approximately 2280° F. in a period of time of about two hours and held at that temperature for approximately fifteen minutes. The disk was then gradually allowed to cool down to room temperature.

The disks as prepared above, when analyzed for $P_2O_5$ content by conventional wet techniques, show about 15.9 weight percent $P_2O_5$. When analyzed by conventional flame emission spectrographic techniques to determine the alkali content, these disks show the following alkali content: $Na_2O$ — 156 ppm, $K_2O$ — 50 ppm, $Li_2O$ — 35 ppm.

The disk having the nominal 5.1 inch diameter produced in the manner described above was then used as a target material to sputter coatings onto silicon chips and platinum substrates using conventional RF sputtering techniques. In this specific instance a low energy sputtering unit, such as that supplied by Consolidated Vacuum Corporation, as their type AST—100 unit employing their AST–200 (RF amplifier) was used. The substrates which were coated, i.e., silicon chips and platinum substrates, were rotated during the sputtering application and the sputtering was done under an argon pressure of about 5 microns with 700 watts at a frequency of 13.56 mHz. During the initial stages of the sputtering, that is, in the first 10 or 15 minutes, the system was somewhat unstable, which was apparently caused by some outgassing from the target being employed; however, after this period of time, the sputtering progressed very uniformly and produced excellent high quality films on these silicon chips and platinum substrate.

EXAMPLE 2

Into a reactor there was charged about 416 grams of ethyl orthosilicate (about 2 moles) and about 350 grams of 2-propanol, the charging being done at room temperature with stirring to produce a clear, single phase solution. To this solution there was then added about 62.5 grams of distilled water, with stirring, in about 12.5 gram increments over a period of approximately 3 minutes. After this addition, there again remained a clear solution. To this solution there was then added about 2.3 ml of 0.1 N HCL and the clear solution heated, with stirring, to the reflux temperature of about 82° c. At this point there has now been charged approximately 3.6 moles of water and 2 moles of ethyl orthosilicate or about 1.8 equivalents of water per equivalent of ethyl silicate. The refluxing was continued for approximately two hours and after this point, using conventional Garman take-offs, approximately 492.8 grams of solvent, which include propanol and some ethanol and water as reaction products, were removed from the system. There remained a solution of a partially hydrolyzed and partially condensed ethyl silicate. The remaining solution (about 338 grams), containing about 35.5 percent of equivalent silica (as $SiO_2$), was then divided into two equal aliquots and each of the 169 grams of solution was then placed in a beaker. Into one of the beakers there was then added 5 ml of an aqueous $H_3PO_4$ solution (containing about 9.73 grams of $H_3PO_4$ per 100 ml of solution) and into the other beaker there was added 3 ml of the same as $H_3PO_4$ solution with stirring. After the addition of the aqueous phosphoric acid solutions, the system was a clear solution. Into each of these solutions there was then slowly added with stirring about 15 ml of distilled water over a period of a minute or two for purposes of hydrolyzing residual ethoxy groups. There was produced at this point clear and transparent solutions. These solutions, after standing for about 24 hours, then formed firm gels, which gels were then dried for about 7 hours at 50° C. in a vacuum oven under a vacuum of about 25 inches of mercury. After the drying of these samples, each of the samples was heated according to the following heat schedule, the heating being done in a recirclating oven: 200° C. for about 24 hours, then about 250° C. for 18 hours, followed by 300° C. for about two and one-half hours, then 350° C. for about four and one-half hours and, finally, heating at about 400° C. for 22 hours. After this heating schedule, there was then produced a pure white particulate product.

The foregoing illustrates the formation of not only a partially hydrolyzed silicon alkoxide but also a partially condensed silicon alkoxide which may be employed to form the novel oxide product having phosphorus-oxygen silicon linkages. Usually, if refluxing is practiced, the reflux period will be for several hours, e.g., 10 or less, but periods of about ¼ hour to about 5 hours are more common. Additionally, the stripping off of solvent and/or alkanol by-product to concentrate the solution will usually effect the removal of sufficient solvent and/or alkanol by-product to produce a solution having a concentration of less than about 50 weight percent, preferably less than about 40, of equivalent $SiO_2$.

Thus, while the above describes the present invention and enables one skilled in the art to make and use same, it will, of course, be apparent that modifications are possible which, pursuant to the patent laws and statutes, are comprehended within the scope of the present invention.

I claim:

1. A method for producing a unitary, sputterable, homogeneous oxide product consisting essentially of about 8 to about 26 weight percent $P_2O_5$ and about 92 to about 74 weight percent $SiO_2$ which consists of:
    a. hydrolyzing ethyl orthosilicate with water in the presence of a sufficient quantity of an alcohol and in the presence of an effective catalytic amount of an acid hydrolysis catalyst to form a single phase solution of an at least partially hydrolyzed ethyl orthosilicate, the amount of water to the amount of ethyl orthosilicate being in the molar ratio of about 1:1,
    b. reacting the at least partially hydrolyzed ethyl orthosilicate solution with orthophosphoric acid to form a clear solution of a soluble substantially linear, further polymerizable polymer having phosphorus-oxygen-silicon linkages, the amount of phosphoric acid added, based on its equivalent $P_2O_5$ content, being so selected that the system based exclusively on $P_2O_5$ and the $SiO_2$ equivalent of the ethyl orthosilicate will consist essentially of about 8–26% $P_2O_5$ and 92–74 weight percent $SiO_2$,
    c. cross-linking the soluble, substantially linear, further polymerizable polymer by the addition of a sufficient quantity of water to the product of step (b) to convert said product to a gel,
    d. heating the gel to a temperature and for a time sufficient to decompose said gel to a granular oxide product of silicon and phosphorus, e. converting the oxide product of step (d) to said unitary product by sintering or by melting to form a glass.

2. A method for producing a homogeneous oxide product consisting essentially of phosphorus and silicon which consists of:

a. forming a clear solution of a soluble, substantially linear, further polymerizable polymer having phosphorus-oxygen-silicon linkages by intimately contacting phosphoric acid, phosphorus acid, phosphorus pentoxide or mixtures thereof with a single phase acid solution of an at least partially hydrolyzed silicon alkoxide, said silicon alkoxide being a compound of the formula

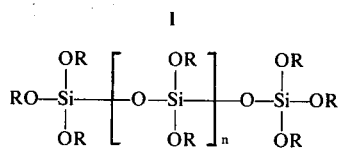

, wherein n is an integer between 0 and 10 and wherein R is an alkyl group having 1–6 carbon atoms, or $SiX_nY_{(4-n)}$ , wherein X is phenyl or an alkyl having 1 to 6 carbon atoms, n is 0 or 1, and Y is OR, wherein R is an alkyl of 1 to 6 carbon atoms, the amount of phosphorus pentoxide, or its equivalent, being between about 0.3 parts by weight per 99 parts by weight of equivalent $SiO_2$ to about 1 mole per mole of equivalent $SiO_2$, b. converting said solution of said further polymerizable polymer to a gel in the presence of a sufficient quantity of water to cross-link said polymer, c. removing free liquid components from said gel and thermally degrading the residue to said homogeneous oxide product.

3. The method of claim 2 wherein said silicon alkoxide is a compound of the formula $SiX_nY_{(4-n)}$, and wherein n is 0.

4. The method of claim 3 wherein R is ethyl.

5. The method of claim 2 wherein said silicon alkoxide is a compond of the formula $SiX_nY_{(4-n)}$, and wherein n is 1.

6. The method of claim 5 wherein X is phenyl.

7. A method for producing a homogeneous oxide product consisting essentially of phosphorous oxide and silicon oxide which consists of:

a. heating a compound of the formula $SiX_nY_{(4-n)}$, wherein n is 0 or 1, X is phenyl, or an alkyl of 1 to 6 carbon atoms, Y is OR wherein R is an alkyl of 1 to 6 carbon atoms, or of the formula

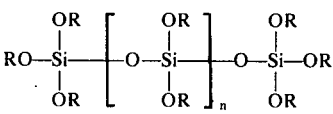

, wherein n is an integer from 0 to 10 and R is an alkyl having 1 to 6 carbon atoms, in the presence of an effective catalytic amount of an acid hydrolysis catalyst with water to a temperature and for a time sufficient to at least partially hydrolyze said compound and produce a single phase solution, b. reacting said single phase solution of said at least partially hydrolyzed compound with phosphoric acid, phosphorous acid, phosphorus pentoxide or mixtures thereof, to form a clear solution of a substantially linear, solvent-soluble, further polymerizable polymer having phosphorus-oxygen-silicon linkages, the amount of phosphorus pentoxide, or its equivalent, being between about 0.3 parts by weight per 99 parts by weight of equivalent $SiO_2$ to about 1 mole per mole of equivalent $SiO_2$, c. converting said linear polymer in solution to a cross-linked polymer in the presence of a sufficient quantity of water to gel said solution, d. heating the gel to a temperature and for a time sufficient to decompose said gel to said homogeneous oxide product.

8. The method of claim 7 wherein said compound is of the formula $SiX_nY_{(-n)}$ and wherein n is 0.

9. The method of claim 8 wherein R is ethyl.

10. The method of claim 9 and further including the step of compacting the product of step (d) into a substantially solid unitary body.

* * * * *

UNITED STATES PATENT OFFICE
CERTIFICATE OF CORRECTION

Patent No. 3,767,432     Dated October 23, 1973

Inventor(s) Ian M. Thomas

It is certified that error appears in the above-identified patent and that said Letters Patent are hereby corrected as shown below:

In the Title and in Column 1, line 1, "SIO₂" should be --SiO₂--.

Column 4, lines 52-56, and in Column 11, lines 17-20, and in Column 12, lines 10-14, the formula

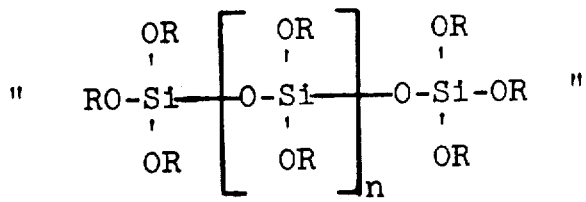

should read

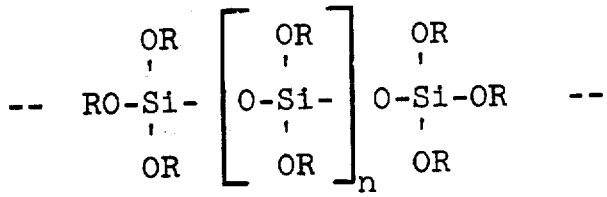

Column 12, line 38, the formula "$SiX_n Y_{(-n)}$" should read --$SiX_n Y_{(4-n)}$--.

Signed and sealed this 2nd day of July 1974.

(SEAL)
Attest

EDWARD M. FLETCHER, JR.
Attesting Officer

C. MARSHALL DANN
Commissioner of Patents